United States Patent [19]
Chen

[11] Patent Number: 5,742,368
[45] Date of Patent: Apr. 21, 1998

[54] REFLECTION LIQUID CRYSTAL DISPLAY DEVICE

[75] Inventor: GuoPing Chen, Iwate-ken, Japan

[73] Assignee: Alps Electric co., Ltd., Tokyo, Japan

[21] Appl. No.: 774,791

[22] Filed: Dec. 30, 1996

[30] Foreign Application Priority Data

Jan. 11, 1996 [JP] Japan .................................. 8-003379

[51] Int. Cl.$^6$ .......................... G02F 1/1335; C09K 19/60
[52] U.S. Cl. .......................... 349/117; 349/113; 349/165
[58] Field of Search ............................... 349/117, 113, 349/165

[56] References Cited

U.S. PATENT DOCUMENTS

| | | | |
|---|---|---|---|
| 3,833,287 | 9/1974 | Taylor et al. | 349/117 |
| 3,912,369 | 10/1975 | Kashnow | 349/117 |
| 4,272,162 | 6/1981 | Togashi et al. | 349/117 |

*Primary Examiner*—William L. Sikes
*Assistant Examiner*—Julie Ngo
*Attorney, Agent, or Firm*—Guy W. Shoup

[57] ABSTRACT

A reflection liquid crystal display device which comprises a display substrate and a back substrate each having an electrode, and disposed in spaced opposition to each other; a liquid crystal layer which is provided between the display substrate and the back substrate, and composed of nematic liquid crystal to which dichromatic dye is added; a reflector plate provided on the back substrate; and a quarter-wave plate provided between the reflector plate and the liquid crystal layer. In the liquid crystal display device, twist pitch P of the liquid crystal and the distance d between the substrates satisfy the following expression:

$$\tfrac{1}{4} \leq d/P < \tfrac{3}{4}.$$

4 Claims, 6 Drawing Sheets

REFLECTION LIQUID CRYSTAL DISPLAY DEVICE

BACKGROUND OF THE INVENTION

1. Field of the Invention

The present invention relates to a liquid crystal display device for use in various displaying apparatuses, and more particularly, to a reflection liquid crystal display device having increased contrast.

2. Description of the Related Art

Liquid crystal display devices have been widely used because reductions in size, thickness and power consumption can be easily achieved due to properties thereof.

Such liquid crystal display devices can be divided into two main types: a reflection liquid crystal display device in which light entering from a display is utilized and power is consumed only for driving liquid crystal molecules; and a transmission liquid crystal display device in which a light source (back light) is provided at the back of the device and a display is effected by light transmitted from the light source.

A conventional reflection liquid crystal display device is shown in FIG. 9. Referring to FIG. 9, in a liquid crystal display device 10, two sheets of glass substrate, i.e., a display substrate 11 and a back substrate 12 are disposed in spaced opposition to each other, and transparent electrodes 13, 14 and alignment films 15, 16 are provided inside each of the substrates 11 and 12, respectively, and further a liquid crystal layer 21 composed of liquid crystal molecules is provided between the substrates 11 and 12. A sealing material 17 seals the liquid crystal molecules, and defines the distance between the display substrate 11 and the back substrate 12. In the liquid crystal display device 10, the alignment films 15 and 16 are arranged so that the liquid crystal molecules are gradually twisted and orientation axes of the upper alignment film 15 and the lower alignment film 16 differ by 90° to each other when voltage is not applied between the electrodes 13 and 14.

In addition, polarizing plates 18 and 19 are provided outside the substrates 11 and 12, respectively, and a reflector plate 20 is provided on the back side alone. The display polarizing plate 18 and the back polarizing plate 19 are arranged so that optical axes thereof differ by 90° to each other. To simplify the description, the optical axis of the display polarizing plate 18 is referred to as being in the horizontal direction, and the optical axis of the back polarizing plate 19 is referred to as being in the vertical direction for convenience.

in the liquid crystal display device 10, when a voltage is not applied between the transparent electrodes 13 and 14 (represented by right-hand (X) in FIG. 9), only a light beam of incident light from the display, which is polarized in the horizontal direction, passes through the polarizing plate 18 and subsequently, passes through the display substrate 11, the transparent electrode 13 and the alignment film 15. By passing along the twisted liquid crystal molecules, the light turns its direction of polarization 90° to become a vertically polarized light beam, and thereafter passes through the alignment film 16, the transparent electrode 14, the back substrate 12 and the polarizing plate 19. Then, the light is reflected from the reflector plate 20 and passes again through the polarizing plate 19, the back substrate 12, the transparent electrode 14 and the alignment film 16. By passing along the twisted liquid crystal molecules, the light turns its direction of polarization 90° to become a horizontally polarized light beam, and thereafter passes through the alignment film 15, the transparent electrode 13, the display substrate 11 and the polarizing plate 18. In this way, the incident light is reflected from the reflector plate 20 to return as reflected light, so that a bright screen display of the liquid crystal display device is produced.

In contrast, when the voltage is applied between the electrodes 13 and 14 (represented by left-hand (Y) in FIG. 9), only a light beam of incident light from the display, which is polarized in the horizontal direction, passes through the polarizing plate 18, and subsequently, passes through the display substrate 11, the transparent electrode 13, and the alignment film 15. Since the liquid crystal molecules are not twisted, the light passes through the alignment film 16, the transparent electrode 14 and the back substrate 12 without turning its direction of polarization. Since the incident light is polarized in the horizontal direction, it neither passes through the polarizing plate 19 nor reaches the reflector plate 20. Therefore, the incident light does not return as reflected light, so that a dark screen display is produced.

By controlling the application of voltage between the electrodes, brightness and darkness of the screen display can be adjusted and various types of displays can be shown.

However, in the case of the reflection liquid crystal display device 10, the screen display relies on the reflected light, so there are limits to which the display screen can be brightened. Moreover, since the polarizing plates are employed to utilize only the polarized light beam, utilization efficiency of light is low, and the amount of reflected light is remarkably lower than that of the incident light, so that a dark screen display tends to be produced, and it is difficult to enhance contrast. Thus, a transmission liquid crystal display device has become popular in which a back light is provided at the back of the device and the amount of light is positively increased in order to brighten the display screen and enhance the contrast.

However, since the transmission liquid crystal display device includes a light source, power consumption automatically increases, thereby loosing the low-power consumption property of the liquid crystal display device to some extent.

In recent years, reductions in size of various electronic equipment have been achieved, which has promoted and portable use. With the spread of such portable display devices, demand for reduced power consumption has been remarkable.

In these circumstances, Japanese Unexamined Patent Publication No. 6-160913 discloses a reflection liquid crystal display device which enables a low voltage drive and has excellent contrast. The liquid crystal display device is made by using liquid crystal in which hysteresis occurs with respect to applied voltage in a twisted state of 90° or more.

However, according to the liquid crystal display device, no gradation display can be achieved unless writing time is set to 5 msec or more. In addition, in order to effect an animation display, a cumulative drive for cumulatively applying voltage as shown in FIG. 10 is required. However, according to the liquid crystal display device which utilizes hysteresis of the liquid crystal with respect to the applied voltage, it is impossible to effect the cumulative drive, so the liquid crystal device is unsuitable for the animation display. In addition, in order to allow hysteresis to occur in the liquid crystal, the liquid crystal should be actually twisted 270° or more.

SUMMARY OF THE INVENTION

Accordingly, it is an object of the present invention to provide a reflection liquid crystal display device which greatly reduces power consumption, has a brighter screen display to enhance contrast, and effects animation displays.

According to an aspect of the present invention, there is provided a reflection liquid crystal display device, comprising: a display substrate and a back substrate each having an electrode, and disposed in spaced opposition to each other; a liquid crystal layer which is provided between the display substrate and the back substrate and composed of nematic liquid crystal to which dichromatic dye is added, a reflector plate provided on the back substrate; and a quarter-wave plate provided between the reflector plate and the liquid crystal layer, wherein twist pitch P of the liquid crystal and the distance d between the substrates satisfy the following expression:

$$¼ \leq d/P < ¾.$$

At this time, it is preferable that the angle formed between an orientation axis of the liquid crystal in the back substrate and an optical axis of the quarter-wave plate be 45°.

In addition, it is preferable that the reflector plate is a specular reflector plate, and a light diffusing sheet is provided on the display substrate.

Further, it is preferable that refractive index anisotropy $\Delta n$ and the twist pitch P satisfy the following expression:

$$1 \; \mu m \leq \Delta n \cdot P \leq 5 \; \mu m.$$

DESCRIPTION OF THE PREFERRED EMBODIMENT

Figure 1:
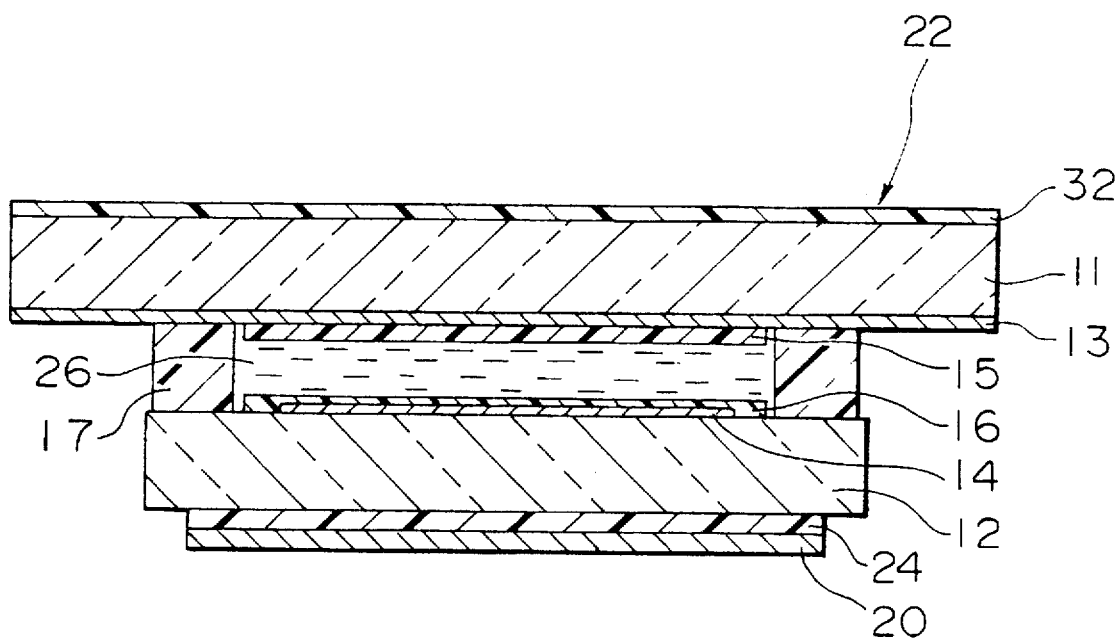
FIG. 1 is a sectional side view showing an embodiment of the present invention.

FIG. 1 illustrates an embodiment of the present invention.

A liquid crystal display device 22 in this embodiment includes in order from a displaying surface (upside in FIG. 1) a light diffusing sheet 32, a transparent display substrate 11 made of glass etc., a transparent electrode 13 formed of indium-tin oxide (ITO) etc., alignment films 15, 16 formed of polyimide resin etc., a transparent electrode 14, a back substrate 12, a quarter-wave plate 24 and a reflector plate 20, and a liquid crystal layer 26 composed of liquid crystal molecules sealed by a sealing material 17 which is provided between the substrates 11 and 12. That is, polarizing plates are not included.

As the liquid crystal, nematic liquid crystal containing dichromatic dye is required.

In addition, the alignment films 15 and 16 are oriented in different directions by 90° to each other so that the liquid crystal is twisted at 90° when voltage is not applied thereto. To simplify the description, the orientation direction of the display alignment film 15 is referred to as a vertical direction, and the orientation direction of the back alignment film 16 is referred to as a horizontal direction for convenience.

Further, it is also required that the distance between the substrates, to be exact, the distance d between the alignment films or electrodes if they are provided, and twist pitch P of the liquid crystal satisfy the following expression: $¼ \leq d/P < ¾$. By increasing d/P to ¼ or more, the liquid crystal can be quickly initialized and response speed is increased so that the liquid crystal can be used in a simple matrix and a high-definition and large-screen display can be achieved. By decreasing d/P to less than ¾, the liquid crystal is not twisted by a large angle so the occurrence of hysteresis is prevented and a gradation display or a cumulative drive, and an animation display can be achieved.

Still further, it is preferable that an angle formed between an orientation axis (the orientation direction of the alignment film if it is provided) and an optical axis of the quarter-wave plate 24 be 45° because utilization efficiency of light can be increased, and contrast is improved.

The light diffusing sheet 32 provided on the display substrate 11 has the function of scattering light by suitably refracting transmitted light, but is not necessarily provided. However, the provision of the light diffusing sheet 32 can widen the angle of visibility of the liquid crystal display device.

In addition, in the reflection liquid crystal display device, a non-specular reflector plate which causes a certain amount of scattering of light is generally used rather than a specular reflector plate in the reflection liquid crystal display device in order to prevent user and background reflection. However, by using the light diffusing sheet 32, the specular reflector plate can be used as the reflector plate 20 while preventing the reflection of the user and background. The specular reflector plate can maintain the light polarization and improve contrast as compared with the non-specular reflector plate.

Further, it is desirable that the product of refractive index anisotropy $\Delta n$ and the twist pitch P (μm) of the liquid crystal molecules be 1 μm or more and 5 μm or less. If the product $\Delta n \cdot P$ exceeds 1 μm, a vibration vector (polarization direction) of incident light can follow the twisting of the liquid crystal molecules, so that deterioration of contrast can be prevented. However, if the product $\Delta n \cdot P$ is 5 μm or more, voltage required for driving undesirably increases.

Figure 2:
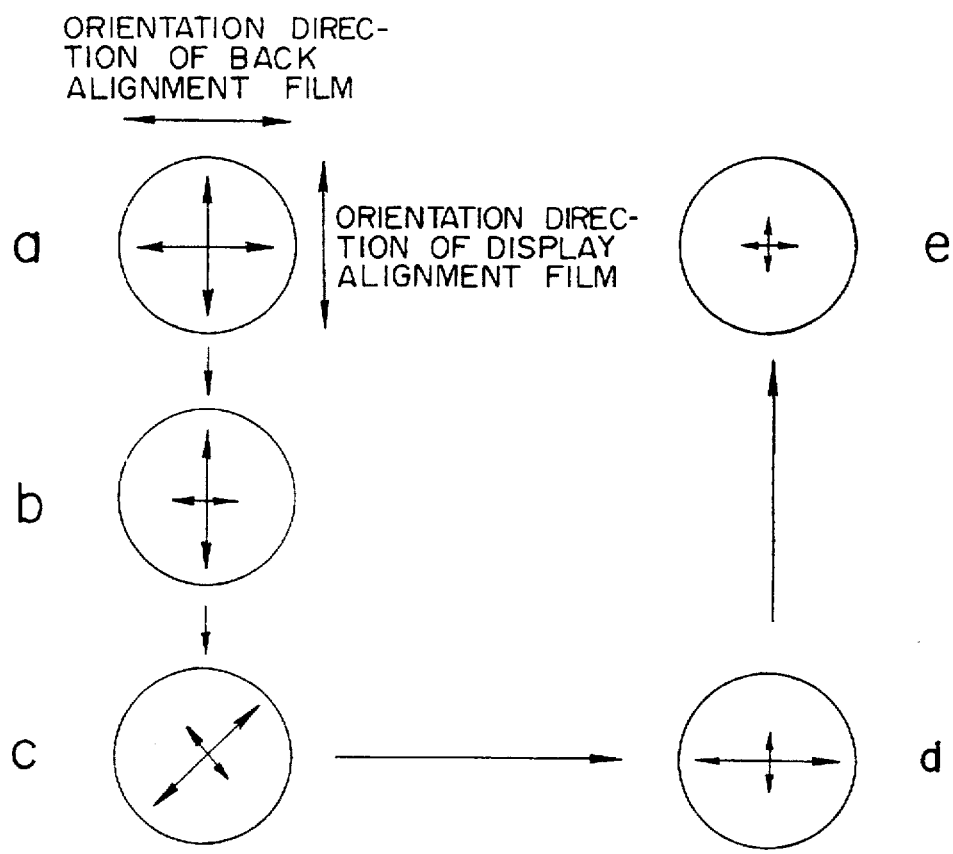
FIG. 2 is a schematic diagram showing a light beam turning in the direction of polarization.

In the liquid crystal display device 22, when a voltage is not applied between the electrodes 13 and 14, incident light from the display passes through the light diffusing sheet 32, the display substrate 11, the electrode 13, and the alignment film 15, and is not polarized at this point in time as shown in a of FIG. 2. In FIG. 2, arrows in each circle represent the polarizing vector of light, and lengths thereof relatively represent the intensity of polarization components.

Subsequently, the incident light then passes through a dichromatic dye-added liquid crystal layer 26 to which dichromatic dyes oriented along the liquid crystal layer are added, thereby being elliptically polarized, as shown in b of FIG. 2, and only a light beam polarized in the longitudinal direction can transmit. Thereafter, the incident light passes through the alignment film 16, the electrode 14 and the back substrate 12. By the passage of the light through the quarter-wave plate 24, the optical axis is turned 45° as shown in c of FIG. 2. In this state, the light is reflected from the reflector plate 20 and passes through the quarter-wave plate 24 again, whereby the optical axis is turned another 45° as shown in d of FIG. 2. Then, the light passes again through the back substrate 12, the electrode 14, the alignment film 16 and the dichromatic dye-added liquid crystal layer 26, whereby almost no incident light passes through, as shown in e of FIG. 2, so that a dark screen display is produced without emission of reflected light from the liquid crystal display device.

Figure 3:
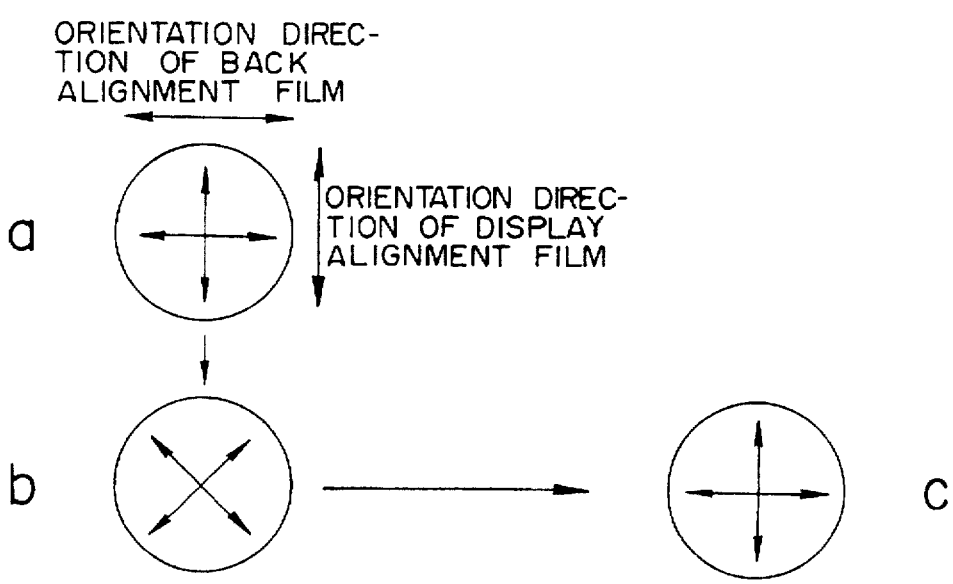
FIG. 3 is a schematic diagram showing a light beam turning in the direction of polarization.

In contrast, when the voltage is applied between the electrodes 13 and 14, the incident light (a of FIG. 3) from the display passes through the display substrate 11, the electrode 13, the alignment film 15 and the dichromatic dye-added liquid crystal layer 26 without change, and subsequently passes through the alignment film 16, the electrode 14 and the back substrate 12. Although the optical axis is turned 45° as shown in b of FIG. 3 by the passage of the light through the quarter-wave plate 24, the light is still reflected from the reflector plate 20. By the passage of the incident light through the quarter-wave plate 24 again, the optical axis is turned 45° as shown in c of FIG. 3. The incident light passes through the back substrate 12, the electrode 14 and the alignment film 16, and passes through the dichromatic dye-added liquid crystal layer 26 again to be emitted from the liquid crystal display device as reflected light, so that a bright screen display is produced.

By controlling the application of voltage between the electrodes, brightness and darkness of the screen display can be adjusted and various types of displays can be shown.

The liquid crystal display device of the present invention is of reflection type which does not require back light, so that power saving can be achieved.

In addition, the crystal display device of the present invention does not employ a polarizing plate, so that almost all of the incident light can be used as reflected light and the display screen can be brightened.

About 1 to 5% by weight of dichromatic dye may be preferably added to the liquid crystal, because of insufficient contrast when less than 1% by weight of the dye is added, and not much enhancement of effect can expected so much even if the amount of the dye is increased to 5% by weight or more.

The liquid crystal display device of the present invention is applicable to a light modulation mirror as well as to display devices of various electronic equipment.

EXAMPLE

Figure 4:
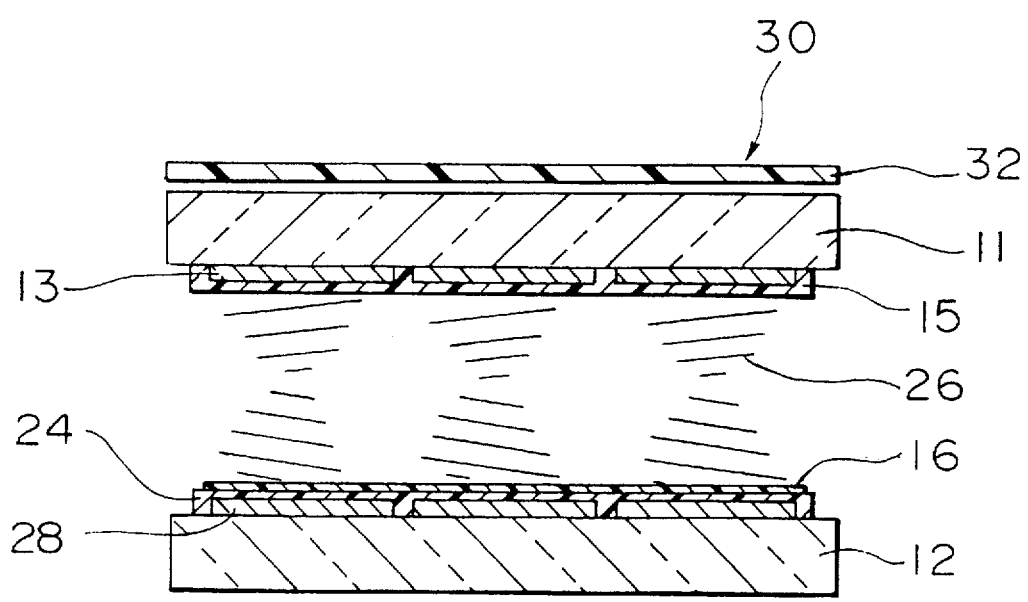
FIG. 4 is a sectional side view showing an embodiment of a liquid crystal display device.

A liquid crystal display device having a construction as shown in FIG. 4 was manufactured to conduct a test of various properties.

The liquid crystal display device 30 includes a display substrate 11 and a back substrate 12 made of glass plate which are disposed in spaced opposition to each other, and a liquid crystal layer 26 composed of nematic liquid crystal ("AP4201" manufactured by CHISSO PETROCHEMICAL CORPORATION) is provided therebetween. Chiral agent ("S-811" manufactured by CHISSO PETROCHEMICAL CORPORATION) is added to the liquid crystal with a refractive index anisotropy Δn of 0.124. Further, 3% by weight of dichromatic dye ("NKX-1366", manufactured by Nippon KANKOH SHIKISO KENKYUSHO) is added to the liquid crystal.

A light diffusing sheet ("OPAL #100T, manufactured by KEIWA SHOKO Co., Ltd.) 32 made of plastic is provided outside the display substrate 11, and a transparent electrode 13 formed of ITO and an alignment film 15 are provided inside the display substrate 11.

A reflector plate 28 made of aluminum having a thickness of 100 nm is provided inside the back substrate 12. The reflector plate 28 serves as an electrode. In addition, a quarter-wave plate 24 formed of a high polymer (aromatic polyamide) liquid crystal film is provided between the reflector plate 28 and the liquid crystal layer 26, and an alignment film 16 is provided thereon.

The space d between the substrates (the distance between the alignment films 15 and 16) of the liquid crystal display device 30 is 10 μm.

In the liquid crystal display device 30, when a voltage is not applied between the electrode 13 and the electrode (reflector plate) 28, incident light from the display passes through the light diffusing sheet 32, the display substrate 11, the electrode 13, the alignment film 15 and the dichromatic dye-added liquid crystal layer 26, thereby being elliptically polarized, and only a light beam polarized in the longitudinal direction can transmit. Thereafter, the incident light passes through the quarter-wave plate 24 after passing through the alignment film 16, whereby the optical axis is turned 45°. In this state, the light is reflected from the reflector plate (electrode) 28 and passes again through the quarter-wave plate 24, whereby the optical axis is further turned 45°. Then, the light passes again through the alignment film 16 and the dichromatic dye-added liquid crystal layer 26, whereby almost no incident light passes through, so that a dark screen display is produced without emission of reflected light from the liquid crystal display device.

In contrast, when the voltage is applied between the electrodes 13 and the electrode (reflector plate) 28, the incident light from the display passes through the display substrate 11, the electrode 13, the alignment film 15 and the dichromatic dye-added liquid crystal layer 26 without change, and subsequently passes through the alignment film 16 and the quarter-wave plate 24, whereby the optical axis is turned 45°. However, the incident light is reflected from the reflector plate (electrode) 28 and passes again through the quarter-wave plate 24, whereby the optical axis is turned 45°. Thereafter, the incident light passes again through the alignment film 16 and the dichromatic dye-added liquid crystal layer 26 without change to be emitted from the liquid crystal display device as reflected light, so that a bright screen display is produced.

By controlling the application of voltage between the electrodes, brightness and darkness of the screen display can be switched and various types of display can be performed.

Although the reflector plate 28 doubling as an electrode made of aluminum and having a mirror surface was employed in the liquid crystal display device 30, no user or background reflection was observed.

[Dependence of contrast on Δn·P]

Figure 5:
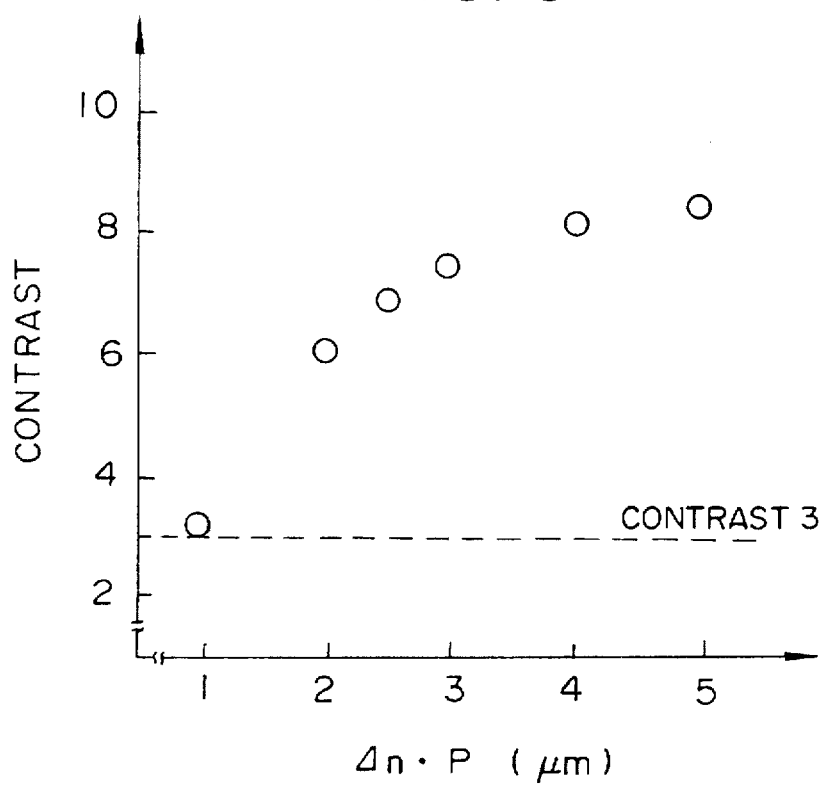
FIG. 5 is a graph showing the relationship between $\Delta n \cdot P$ and contrast.

In the liquid crystal display device 30, the value of the twist pitch P was varied by changing the distance d between the substrates to measure the relationship between Δn·P (the product of refractive index anisotropy in and the twist pitch P of the liquid crystal molecules) and contrast. The measurement results are shown in FIG. 5. The contrast (CR) is the ratio between 90% transmission $T_{90}$ of the drivable maximum transmission to 10% transmission $T_{10}$ of the drivable maximum transmission ($CR=T_{90}/T_{10}$). The larger the contrast, the more the visibility improves, and a contrast of at least 3 or more is needed.

It is clear from FIG. 5 that the contrast gradually increases as Δn·P is increased, and a Δn·P of 1 or more is needed to maintain a contrast of at least 3 or more.

[Dependence of display performance on d/P]

Similarly, in the liquid crystal display device 30, the twist pitch P is fixed, the distance d between the substrates is varied to change the value of the ratio d/P, and the relationship between the ratio and the number of driving lines was measured. The number of driving lines is the maximum number of drivable scanning lines in which no crosstalk is visually recognized. For example, in a liquid crystal display device displaying characters including a kanji in four lines, 64 or more driving lines are needed. The larger the ratio d/P, the higher the degree of twist of the liquid crystal molecules.

Figure 6:
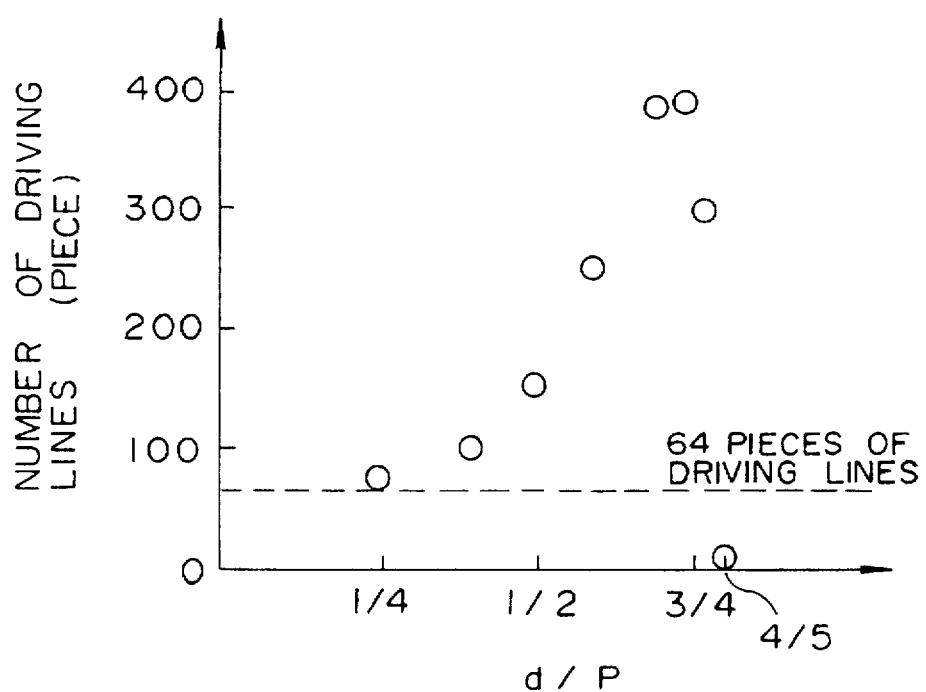
FIG. 6 is a graph showing the relationship between the ratio d/P and the number of driving lines.

The measurement results are shown in FIG. 6. It is clear from FIG. 6 that the number of driving lines gradually increases as the ratio d/P is increased, but decreases suddenly when the ratio d/P exceeds ¾. Therefore, it is understood that a display device with a large displaying capacity of many driving lines can be effectively realized by setting the ratio d/P within a range of ¼ or more to less than ¾.

Accordingly, in order to enhance the contrast, Δn·P may be increased. However, when Δn·P is increased, d should be increased as it is necessary to prevent reduction of d/P. For this reason, when Δn·P is 5 μm or more, d is considerably increased and the necessary voltage undesirably increases.

[Angle formed between orientation axis of liquid crystal and optical axis of quarter-wave plate]

Figure 7:
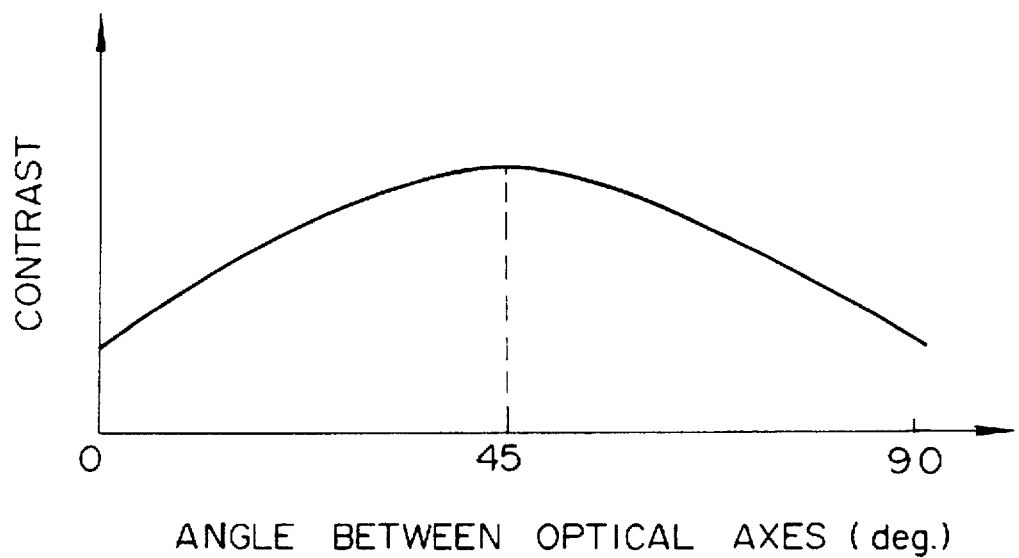
FIG. 7 is a graph showing the relationship between the angle formed between the orientation axis and the optical axis of a quarter-wave plate and the contrast.

The change in contrast in the case of varying the angle formed between the orientation axis of the alignment film 16 and the optical axis of the quarter-wave plate 24 was measured. The ratio d/P was set to 0.5. The measurement results are shown in FIG. 7. Referring to FIG. 7, the vertical axis represents the relative contrast.

It is clear from FIG. 7 that the contrast is most enhanced when the angle formed between the orientation axis and the optical axis is 45°.

[Rate of addition of dichromatic dye]

Figure 8:
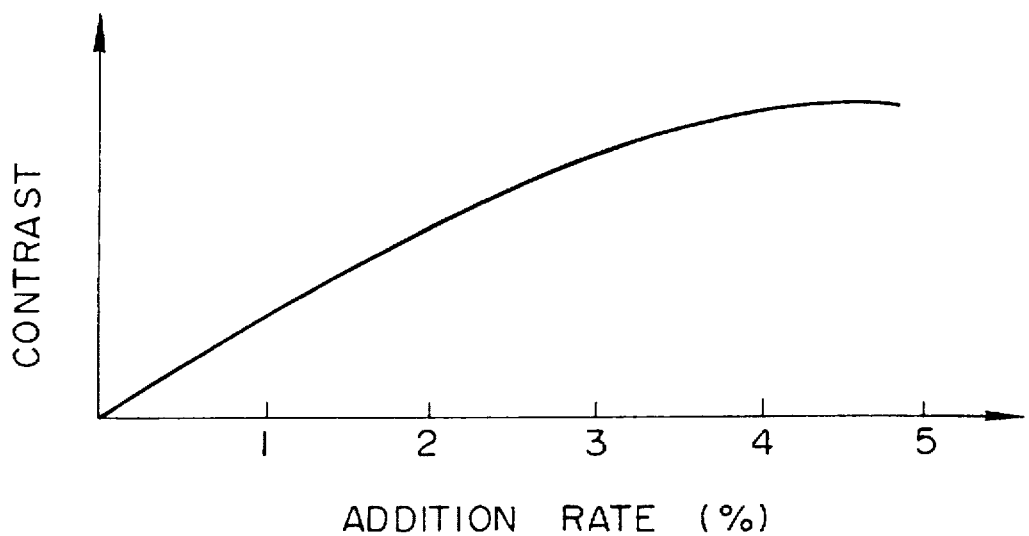
FIG. 8 is a graph showing the relationship between rate of addition of dichromatic dye and the contrast.
Figure 9:
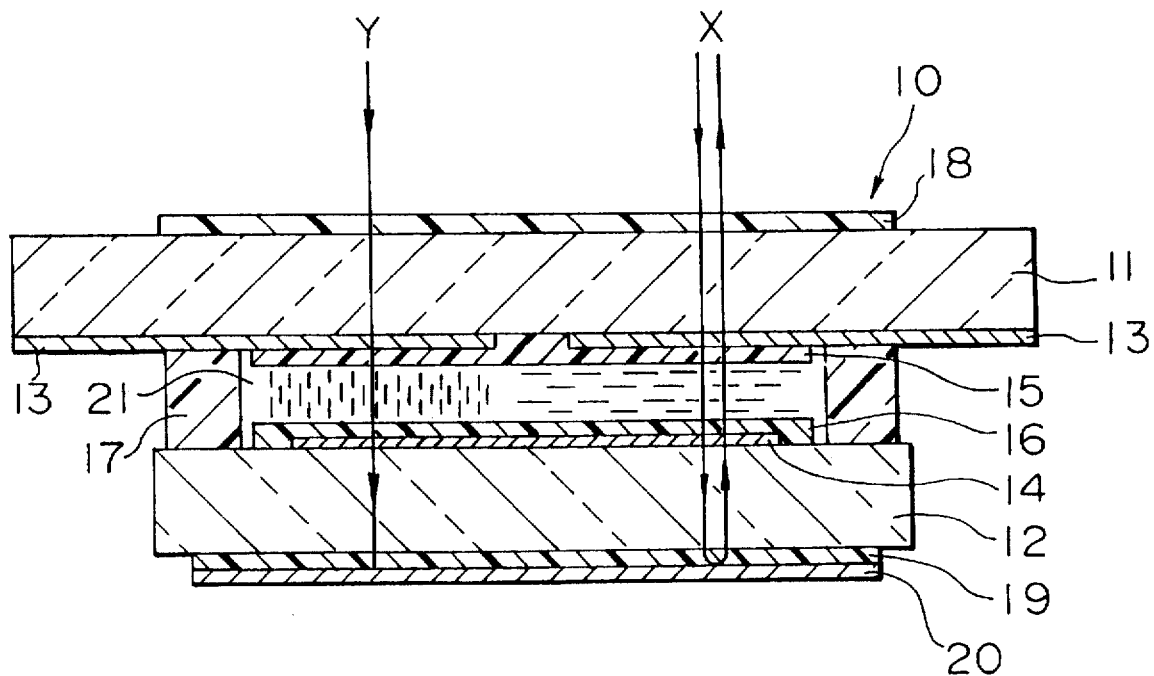
FIG. 9 is a sectional side view showing a conventional reflection liquid crystal display device.
Figure 10:
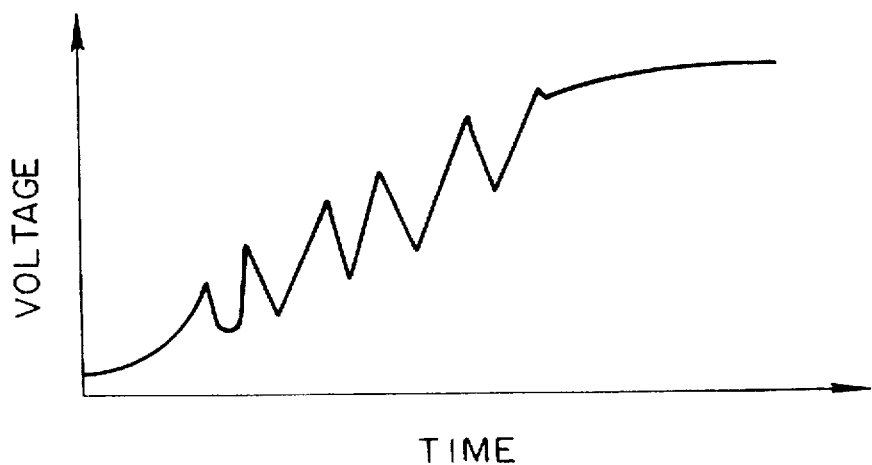
FIG. 10 is a graph showing change in voltage with time during cumulative drive.

Similarly, the change in contrast in the case of varying the amount of the dichromatic dye to be added to the liquid crystal was measured. The ratio d/P was set to 0.5. It is clear from FIG. 8 that the greater the rate of addition up to 5% by weight, the higher the contrast is effectively enhanced, but is less enhanced thereafter.

In spite of the remarkably low power consumption, the reflection liquid crystal display device according to the present invention has a brighter screen display and enhanced contrast because no polarizing plate is used.

In addition, the liquid crystal molecules can be quickly driven, response speed is increased, and a cumulative drive for cumulatively applying voltage can be effected, so that the liquid crystal display device is adaptable to animation displays.

What is claimed is:

1. A reflection liquid crystal display device, comprising:

a display substrate and a back substrate each having an electrode, and disposed in spaced opposition to each other;

a liquid crystal layer which is provided between said display substrate and said back substrate, and composed of nematic liquid crystal to which dichromatic dye is added;

a reflector plate provided on said back substrate; and a quarter-wave plate provided between said reflector plate and said liquid crystal layer, wherein twist pitch P of the liquid crystal and the distance d between said substrates satisfy the following expression:

$$¼ \leq d/P < ¾.$$

2. A reflection liquid crystal display device according to claim 1, wherein the angle formed between an orientation axis of the liquid crystal in said back substrate and an optical axis of said quarter-wave plate is 45°.

3. A reflection liquid crystal display device according to claim 1, wherein said reflector plate is a specular reflector plate, and a light diffusing sheet is provided on said display substrate.

4. A reflection liquid crystal display device according to claim 1, wherein refractive index anisotropy in and the twist pitch P satisfy the following expression:

$$1\ \mu m \leq \Delta n \cdot P \leq 5\ \mu m.$$

* * * * *

UNITED STATES PATENT AND TRADEMARK OFFICE
CERTIFICATE OF CORRECTION

PATENT NO. : 5,742,368
DATED : April 21, 1998
INVENTOR(S) : GuoPing Chen

It is certified that error appears in the above-indentified patent and that said Letters Patent is hereby corrected as shown below:

On the title page, item [73] Assignee: "co.," should read --CO.,--.

In Claim 4, line 2, replace "in" with --Δn--.

Signed and Sealed this

Twenty-sixth Day of January, 1999

Attest:

Attesting Officer

*Acting Commissioner of Patents and Trademarks*